United States Patent [19]
Melbye et al.

[11] Patent Number: 5,826,811
[45] Date of Patent: Oct. 27, 1998

[54] METHOD AND APPARATUS FOR SECURING A REEL IN A CARTRIDGE

[75] Inventors: Hartvig E. Melbye, Boulder; David T. Hoge, Westminster, both of Colo.

[73] Assignee: Storage Technology Corporation, Louisville, Colo.

[21] Appl. No.: 681,561

[22] Filed: Jul. 29, 1996

[51] Int. Cl.[6] .................................. B65D 85/575
[52] U.S. Cl. .................... 242/345.2; 242/326.3; 242/343; 206/415
[58] Field of Search .................. 242/324.1, 324.2, 242/326, 326.3, 327, 343, 345.2, 348; 360/132; 206/413, 415

[56] References Cited

U.S. PATENT DOCUMENTS

| | | | |
|---|---|---|---|
| 2,657,047 | 10/1953 | Eddy | 242/326.3 |
| 3,415,599 | 12/1968 | Winkler et al. | 242/345.1 |
| 3,622,101 | 11/1971 | Sutliff et al. | 242/343 |
| 3,831,881 | 8/1974 | Tucker | 242/343 |
| 4,056,244 | 11/1977 | Matsutsuka | 242/343 |
| 4,304,331 | 12/1981 | Minkow | 242/343 |
| 4,458,857 | 7/1984 | Moore et al. | 242/342 |
| 4,871,064 | 10/1989 | Hehn et al. | 242/343 |
| 4,901,856 | 2/1990 | Thiele | 206/415 |
| 4,934,623 | 6/1990 | Kitsuki | 242/343 |

*Primary Examiner*—John P. Darling
*Attorney, Agent, or Firm*—Timothy R. Schulte

[57] ABSTRACT

A plug inserted into the access opening of a tape cartridge to prevent movement of the reel inside the cartridge. Damage to the tape media is thus prevented by contact of the reel with the tape media. The plug may also be used to seal the access opening and eliminate environmental contamination which would otherwise enter therethrough.

12 Claims, 4 Drawing Sheets

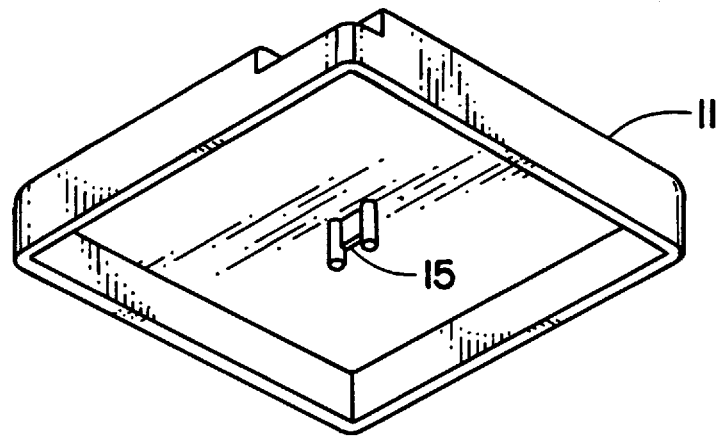
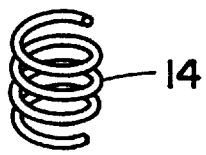
FIG. 2
PRIOR ART
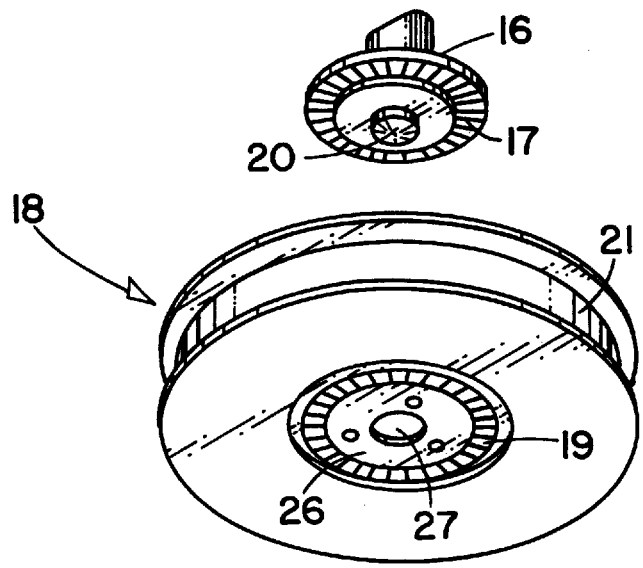
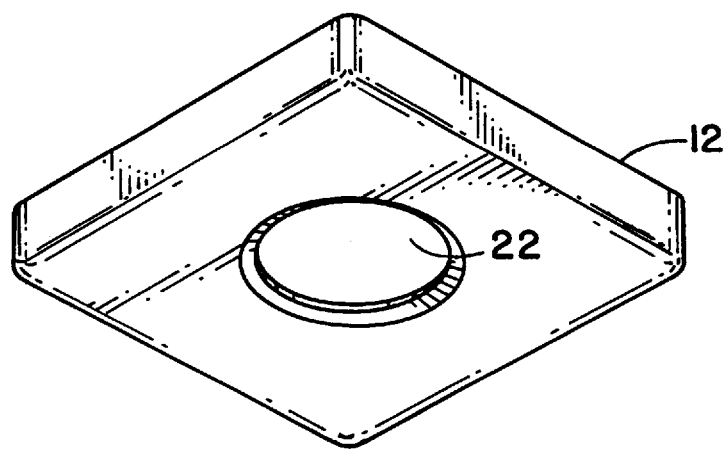

METHOD AND APPARATUS FOR SECURING A REEL IN A CARTRIDGE

BACKGROUND OF THE INVENTION

1. Field of the Invention

The invention relates to the field of special receptacles or packages. More particularly, the invention relates to the field of receptacles or packages for holding a machine readable recording medium. In still greater particularly the invention relates to the field of magnetic tape cartridges including a reel movably mounted in the cartridge. By way of further characterization, but not by way of limitation thereto, the invention is a plug for insertion into the access opening in a cartridge to eliminate reel movement and the resultant tape damage encountered during shipping and handling of the cartridge.

2. Description of the Related Art

Magnetic tape cartridges have been employed for a number of years as a way to conveniently and efficiently store and handle magnetic recording media. Previously, magnetic tape had been contained on large reels which were cumbersome to handle and which required significant labor to place onto and remove from tape reading and writing devices. In order to overcome this problem, International Business Machines of Armonk, N.Y. introduced the 3480 style tape cartridge. The 3480 style cartridge enabled more efficient handling of magnetic recording media and the reading of information stored thereon and the 3480 has gained wide acceptance. The external dimensions and architecture of the 3480 type magnetic cartridge are an industry standard.

Referring to FIG. 1, a 3480 style cartridge consists of a substantially rectangular exterior housing including an upper shell portion 11 which may be made of plastic or other suitable material. A lower shell portion 12 retains a single reel of magnetic tape between it and upper shell 11 with a leader block 13 affixed to one end of the magnetic tape 21. Leader block 13 is exposed through an opening in the housing of the cartridge to allow a tape drive (not shown) to retrieve tape 21 from the cartridge.

Referring to FIG. 2, an exploded view of the tape cartridge illustrates the components contained therein. A spring 14 is retained in the center of portion 11 by guide 15. A break button 16 includes a plurality of teeth 17 to engage similar teeth (not shown) on the backside of reel 18. Reel 18 includes teeth 19 to engage a drive clutch on a tape drive (not shown) in order to rotate reel 18 and thereby allow magnetic media 21 to move over the reading and recording heads in the tape drive as is known to one skilled in the art. Lower portion 12 includes an access opening 22 to allow the drive clutch in the tape drive to engage teeth 19 on reel 18. Spring 14 allows reel 18 to move essentially longitudinally or axially against the spring bias between upper portion 11 and lower portion 12 to allow teeth 19 on reel 18 to align with the drive clutch in the tape drive.

While movement of reel 18 between upper portion 11 and lower portion 12 is necessary during normal operation in a tape drive, it has been found that such movement presents problems during handling outside the tape drive. In particular, the movement of reel 18 may damage magnetic media 21 which is wound thereon. Referring to FIG. 3, a side view of the cartridge is shown. If the cartridge is dropped or otherwise severely jostled, axial or tilting movement of reel 18 may result in reel contact with upper portion 11 or lower portion 12 resulting in the contact of the reel 18 with tape 21. Reel 18 is shown contacting upper portion 11 at 22 and lower portion 12 at 23. These contact points deflect flanged portions 24 of reel 18. In general flanged portions are rather thin and deflect somewhat easily. Deflection of flanged portions 24 results in contact between magnetic media 21 and flanged portions 24 at 25. Deflected flange portion 24 is shown in broken lines in FIG. 3. Because the current design preference among tape manufacturers is to develop media that is thinner, that media is more easily damaged. Besides damage at the outside edge of the media, winding phenomena which results in the uneven or staggered wrap (i.e. packslip, popped strand) of the media onto the reel, renders the tape vulnerable to damage. Thus, for example, in the 3480 type magnetic tape cartridge, damage to the magnetic tape may result in incorrect data track writing or reading by the read and write heads in the tape drive. That is, because the edge of the tape has been creased, errors in reading or writing on these edges may occur.

There are solutions to the problem of tape damage. One solution would be to strengthen flange portions 24 on reel 18. This may protect the tape from damage because the flanged portions would be prevented from deflecting. Strengthening could be done by adding ribs to the flanged portions or by changing the material used to construct the flanged portions. This solution would require expensive and time intensive tool and design changes and would not address the millions of tape cartridges in use today. Of course, greater flange separation would also alleviate the problem but this would also require significant cartridge design changes. Another possible solution would be to wrap less tape media 21 onto reel 18. The contact points 25 on tape media 21 would thus be farther away from the points 22 and 23 at which flanges 24 contact the upper 11 and lower 12 portions of the cartridge housing. However, by putting less tape on a reel, the capacity of the cartridge to store data is reduced and the system performance is reduced by a factor which depends upon the number of cartridges in the library. Thus, this solution is unacceptable to cost and capacity conscious users.

BRIEF DESCRIPTION OF THE DRAWINGS

FIG. 2 is an exploded view of the tape cartridge illustrating the components contained therein;

DESCRIPTION OF THE PREFERRED EMBODIMENT

Figure 1:
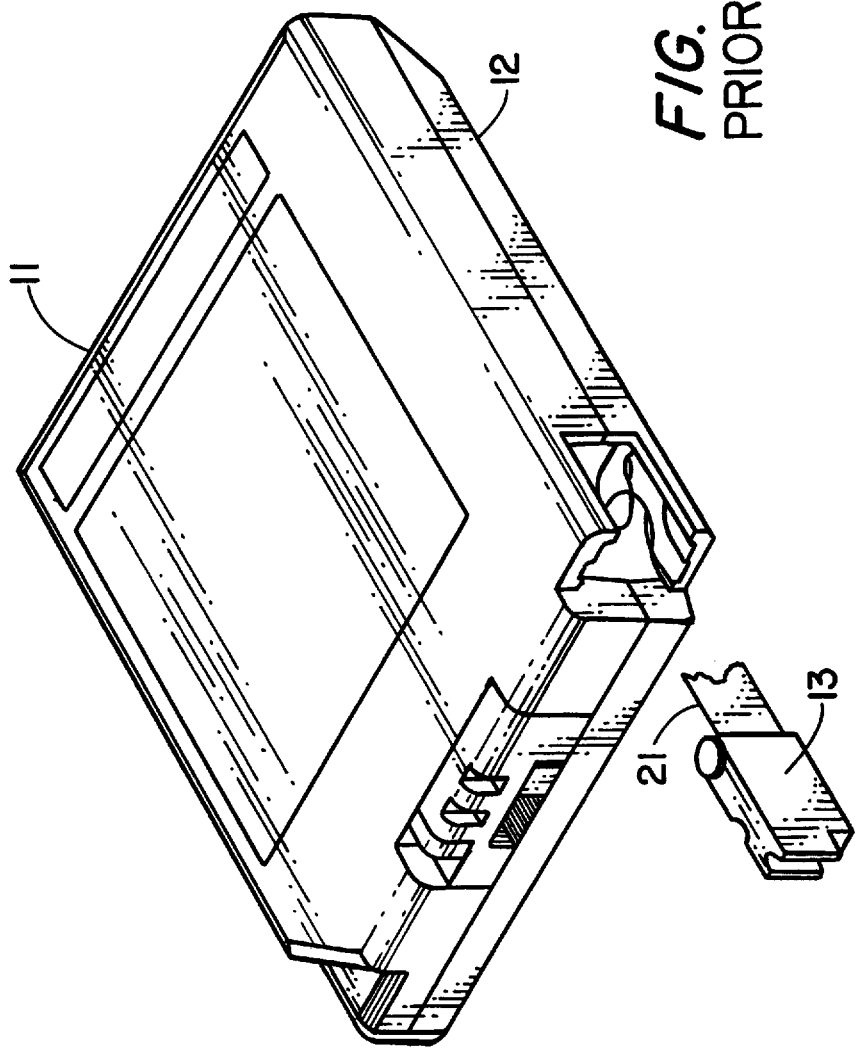
FIG. 1 is a perspective view of a tape cartridge.
Figure 3:
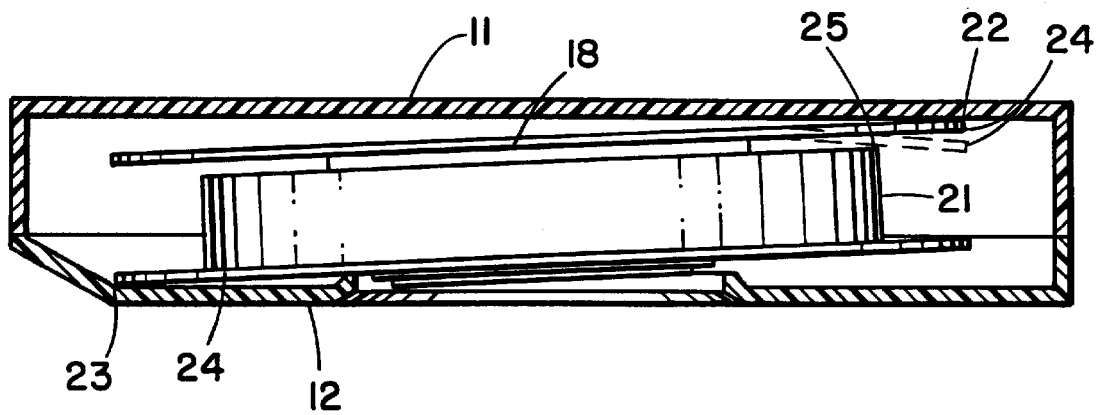
FIG. 3 is a side view of a tape cartridge illustrating the deflection of the flange portions of the reel.
Figure 4:
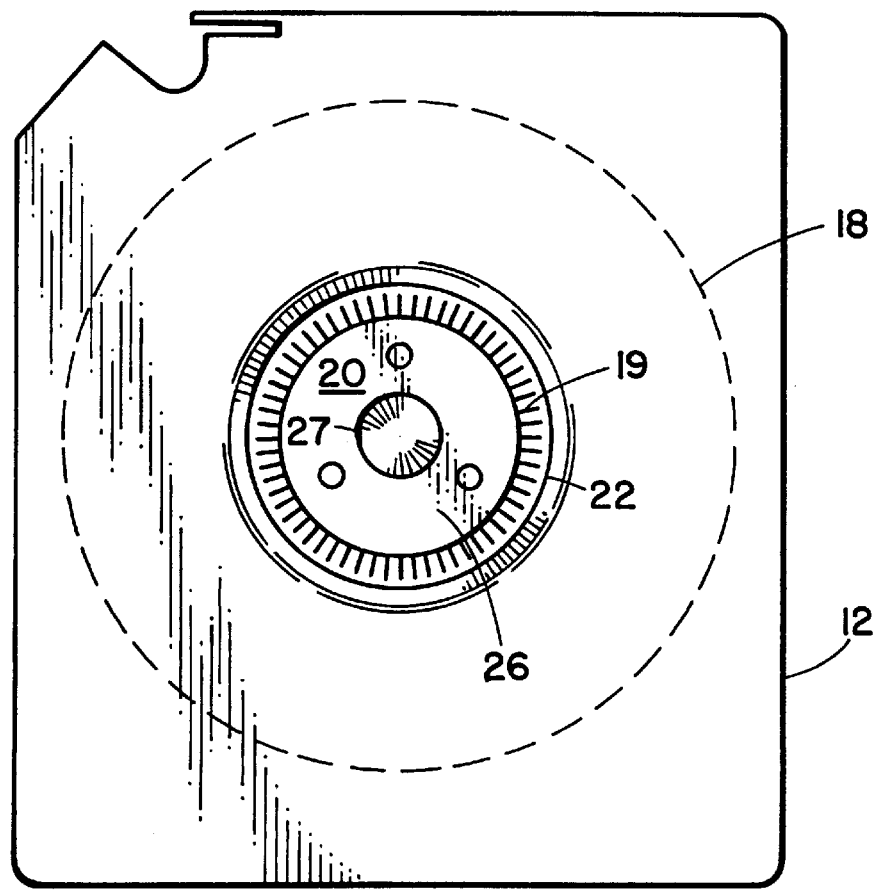
FIG. 4 is a view of the lower portion of the tape cartridge.

Referring to FIG. 4, lower portion 12 of a tape cartridge is shown. The outside edge of reel 18 is shown as a broken line with teeth 19 and a hub portion 26 of reel 18 shown in access opening 22. Center portion 20 of break button 16 is visible through an opening 27 in hub 26. Hub portion 26 is moveable into and out of access opening 22 by exerting pressure against hub portion 26. That is, spring 14 provides light compression of reel 18 against lower portion 12. Because reel 18 is moveable, any impacts or jarring of the cartridge results in the impact of flanges on reel 18 against upper and lower portions 11 and 12 of the cartridge as described above.

Figure 5:
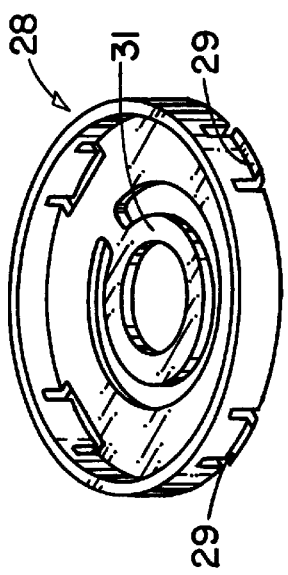
FIG. 5 is a perspective view of the plug of the present invention.

Referring to FIG. 5, the present invention is shown. A plug 28 is provided which generally conforms to the configuration of access opening 22. In the preferred embodiment plug 28 is of a substantially circular configuration and is made of plastic or other elastomeric material. Plug 28 includes a plurality of lip portions 29 which are outwardly biased such that, when plug 28 is fully inserted into access opening 22 these lip portions 29 extend over lower portion 12 around access opening 22 (snap fit) to hold plug 28 securely in place. A grasping ring 31 on plug 28 allows a user to remove plug 28 from access opening 22.

Figure 6:
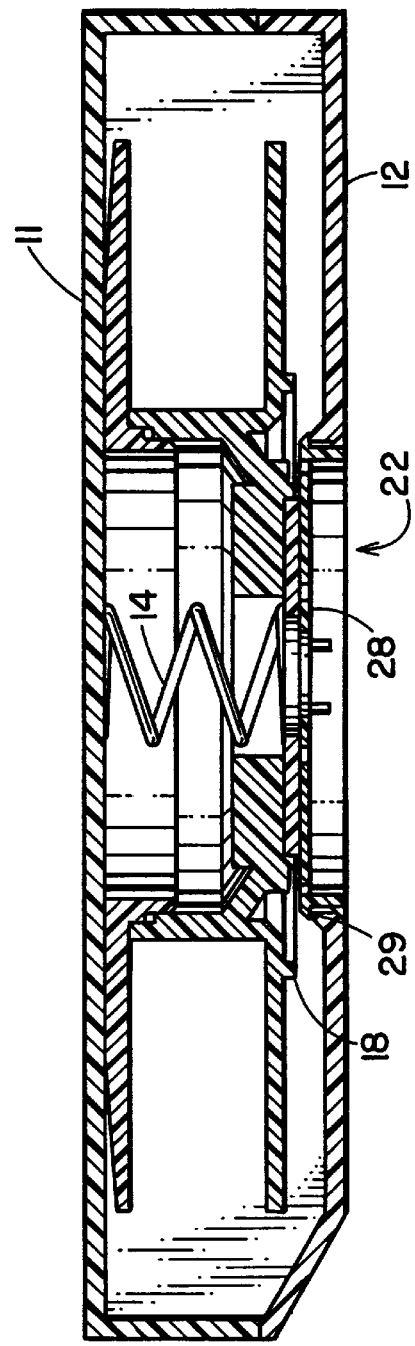
FIG. 6 is a side sectional view of the tape cartridge with the plug inserted therein.

Referring to FIG. 6, plug 28 is shown inserted into access opening 22 in lower portion 12 such that lip portions 29 extend over lower portion 12 around access opening 22. With plug 28 in place against hub 26, reel 18 is biased against spring 14 and upper portion 11. Thus, with plug 28 in place, longitudinal or axial movement of reel 18 due to mechanical vibration of the cartridge is eliminated or substantially reduced. Damage to the magnetic tape 21 from contact with the flanges of reel 18 is thus minimized. When it is desired to place the cartridge into use, an operator may remove plug 28 by pulling grasping ring 31 away from the cartridge.

Figure 7:
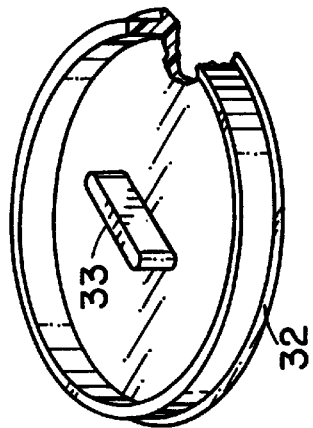
FIG. 7 is a perspective view of an alternate embodiment of the plug of the present invention.

Referring to FIG. 7, an alternate embodiment of plug 28 is shown in which plug 28 is a solid piece of elastomeric material and lip portion 32 may extend around the entire circumference of plug 28. A grasping handle 33 allows the operator to insert and remove plug 28 into and out of access opening 22. As with the first embodiment, plug 28 restrains reel 18 against spring 14 and upper portion 11 of the cartridge. Movement of reel 18 with respect to the cartridge would otherwise cause pressure changes within the cartridge resulting in aspiration of contamination into the cartridge thus degrading performance and reducing the useful life of the cartridge. However, in this embodiment, plug 28 is a solid piece of material, resulting in the substantial sealing of the interior of the cartridge from environmental contamination which would otherwise enter the cartridge through access opening 22. Sealing of access opening 22 during shipping and handling eliminates this source of contamination as well as preventing movement of the reel with respect to the cartridge.

With the present invention, both mechanical vibration and environmental contamination may be minimized as causes of poor tape performance or failure. While the invention has been disclosed with respect to a preferred embodiment thereof, it is not to be so limited as the invention is defined by the appended claims. For example, while the invention has been disclosed with respect to a 3480 type of magnetic tape cartridge, it may be advantageously used with other types of media and cartridges. A VHS type of video cartridge may make use of one or two plugs of the present invention to eliminate mechanical vibration and environmental contamination. An alternative design for a dual reel cartridge would be to join the two plugs by a strip of material to allow both plugs to be removed in tandem. These joined plugs would also ensure that the plugs did not become separated and would allow for convenient use. Similarly, other types of tape cartridges such as helical scan magnetic tape cartridges and the D3 cartridge offered by a number of vendors such as, for example, Matsushita Electric Industry Corp. may employ the present invention.

What is claimed is:

1. In a magnetic tape cartridge having an upper portion and a lower portion, said cartridge including a reel movably mounted between said upper portion and said lower portion, said reel including magnetic tape wound thereon, said cartridge further including a spring located between said reel and said upper portion, said lower cartridge portion including an access opening, a method for preventing damage to said magnetic tape comprising the step of removably mounting a plug in said access opening said plug including a lip portion, said step of removably mounting including inserting said lip portion between said reel and said lower portion such that said reel is biased against said upper portion.

2. A method according to claim 1 wherein said plug is comprised of elastomeric material.

3. A method according to claim 1 further including the step of substantially sealing said plug against the aforesaid reel and the aforesaid lower portion.

4. A method according to claim 1 wherein said magnetic tape cartridge includes a 3480 style cartridge.

5. A magnetic tape cartridge comprising:
    a housing including an upper portion and a lower portion;
    a reel movably mounted between said upper portion and said lower portion;
    said reel including magnetic tape wound thereon;
    a spring mounted between said reel and said upper portion; and
    retaining means including a plug removably mounted in an access opening in said lower portion for biasing said reel against said upper portion, said plug including a lip portion inserted between said reel and said lower portion.

6. A magnetic tape cartridge according to claim 5 wherein said lip portion substantially seals the aforesaid access opening between said reel and said lower portion.

7. A magnetic tape cartridge according to claim 5 which said cartridge includes a 3480 style cartridge.

8. A magnetic tape cartridge according to claim 5 wherein said plug is comprised of elastomeric material.

9. A plug for insertion into a magnetic tape cartridge, said cartridge including an upper portion and a lower portion and a reel movably mounted between said upper portion and said lower portion, said reel including magnetic tape wound thereon, said lower cartridge portion including an access opening, said plug comprising:
    a body portion configured in a shape substantially conforming to said access opening;
    at least one lip portion attached to said body portion, said lip portion configured to extend between said reel and said lower cartridge portion; and
    removing means connected to said body portion for enabling said plug to be removed from said magnetic tape cartridge.

10. A plug according to claim 9 wherein said body portion and said lip portions are comprised of elastomeric material.

11. A plug according to claim 9 wherein said lip portion substantially seals said access opening between said reel and said lower portion.

12. A plug according to claim 9 wherein said magnetic tape cartridge includes a 3480 style cartridge.

* * * * *